(No Model.) 2 Sheets—Sheet 2.

W. W. HENDRIX.
ELECTRIC RAILWAY TROLLEY.

No. 511,018. Patented Dec. 19, 1893.

Witnesses
N. Moffett
Percy White

Inventor
W. W. Hendrix
By Glascock & Co.
Attorneys.

UNITED STATES PATENT OFFICE.

WILLIAM W. HENDRIX, OF BOWLING GREEN, KENTUCKY.

ELECTRIC-RAILWAY TROLLEY.

SPECIFICATION forming part of Letters Patent No. 511,018, dated December 19, 1893.

Application filed August 5, 1892. Renewed November 22, 1893. Serial No. 491,684. (No model.)

*To all whom it may concern:*

Be it known that I, WILLIAM W. HENDRIX, a citizen of the United States, residing at Bowling Green, in the county of Warren and State of Kentucky, have invented a certain new, useful, and valuable Improvement in Attachments for Electric-Railway Trolleys, of which the following is a full, clear, and exact description.

My invention has relation to attachments for electric railway trolleys. Said invention is adapted to prevent the trolley from jumping off the wire while the car is in motion.

Figure 1:
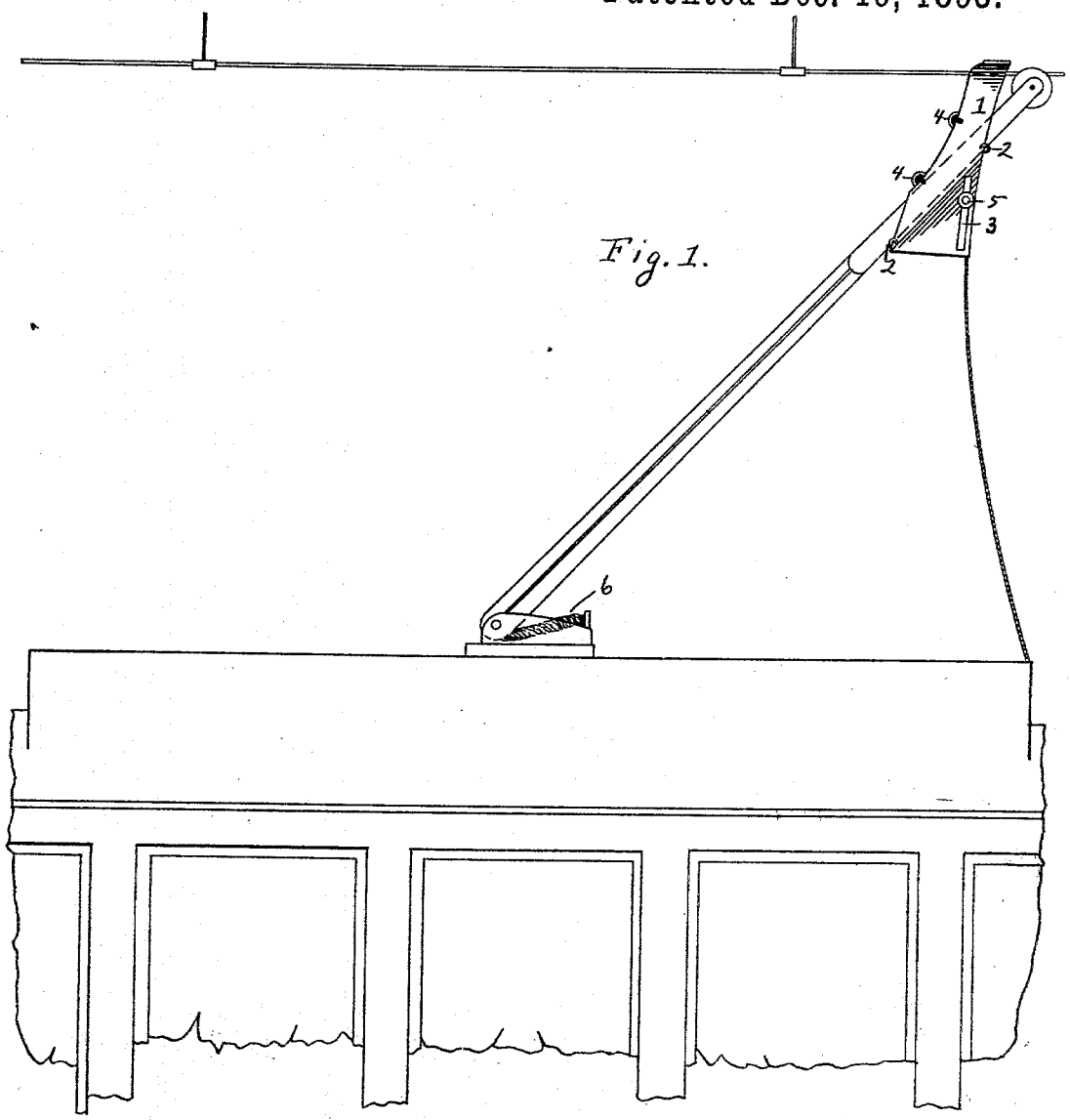
Figure 2:
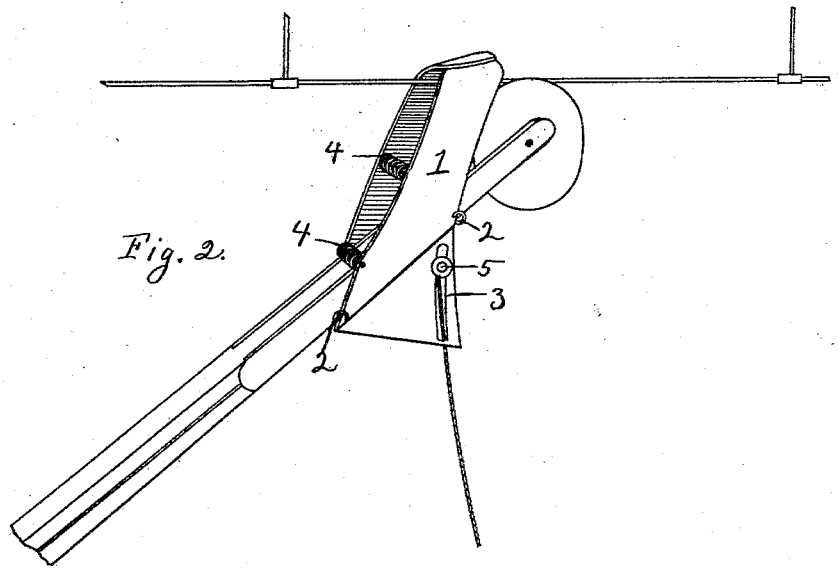
Figure 3:
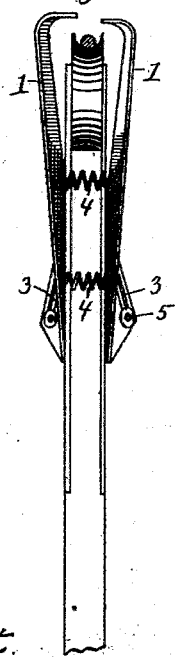
Figure 4:
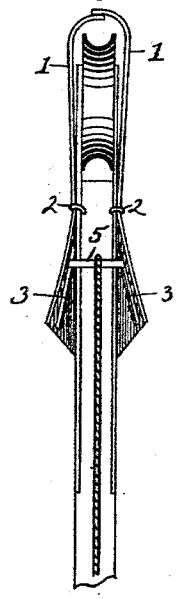

In the accompanying drawings: Figure 1, is a side elevation of an electric car using the overhead system, said car having attached to its trolley my invention. Fig. 2, is a detail in perspective of the trolley and the attachment. Fig. 3, is a front view of the trolley and the attachment. Fig. 4, is a rear view of the trolley and attachment.

My invention is described as follows:

To the trolley ordinarily used in overhead systems is secured one on each side near the wheel end of said trolley a jaw 1, said jaws being hinged to the said trolley at the points 2, 2. The upper end of the jaw terminates in an end bent inward or toward the opposite jaw, the end of one jaw overlapping the end of the other. The lower end of the jaw flares out at an angle and is provided with a generally-perpendicular-extending elongated perforation 3. Both jaws are identical in their construction excepting one is made to work on the right and the other on the left of the trolley. The two jaws are held together by the springs 4, 4, or one spring may be substituted for the two shown, the number of springs used being immaterial. The lower ends of the said jaws are connected by the bolt 5, which works in the elongated perforations 3, 3, the ends of the said bolt being provided with washers riveted on as shown or any other means for preventing the said bolt from coming out may be used. Said bolt 5, is adapted to work up and down in the said slots or perforations. The trolley rope is attached to the bolt 5. The tension of the spring or springs 4, 4, is less than the tension of the spring 6, which operates against the lower end of the trolley and is adapted to keep the wheel against the wire. The function of the difference in the tensions of these springs will be explained and set forth hereinafter.

In operation the wheel of the trolley is adapted to bear against the wire and the ends of the jaws are adapted to overlap over the wire. Thus the trolley wheel is prevented from jumping from the wire while the car is in motion. When it is desired to pull the trolley wheel from the wire, the rope which is attached to the bolt 5, is pulled; this causes said bolt to descend which pulls the flaring ends of the jaws together and as said jaws are hinged at the points 2, 2, the upper ends of said jaws will come apart, as shown in Fig. 3. When the bolt 5, reaches the bottoms of the perforations the force applied to the rope and which has heretofore been operating on the tension of the springs 4, 4, will now operate on the tension of the spring 6, and as its tension is overcome the trolley will descend, the wire passing through the ends of the open jaws.

It will be observed in Fig. 2, that the front edges of the upper ends of the jaws are beveled to the rear and when said jaws are closed their edges form a V flaring to the front. The function of this construction is that when the trolley approaches the supports of the wire, said supports respectively will enter the V and pry the two jaws apart, and when the support is passed the springs 4, will cause the two jaws to close automatically.

Having thus described my invention, what I claim as new, and desire to secure by Letters Patent, is—

1. An attachment for electric railway trolleys consisting of two jaws hinged one on each side of the trolley, the upper ends of said jaws adapted to overlap over the wire and the lower ends of said jaws flaring at an angle and having elongated perforations, suitable springs connecting said jaws above their hinged point, a cross bolt adapted to work up and down in the elongated perforations and a trolley rope attached to said cross bolt substantially as shown and described and for the purposes set forth.

2. An attachment for electric railway trolleys consisting of two jaws hinged one on each side of the trolley, the upper ends of said jaws adapted to overlap over the wire, suitable springs connecting said jaws above their hinged point, substantially as set forth.

3. An attachment for electric railway trolleys consisting of two jaws hinged one on each side of the trolley, the upper ends of said jaws having their front edges beveled to the rear, said upper ends adapted to overlap over the wire, suitable springs connecting said jaws above their hinged point, substantially as set forth.

In testimony whereof I affix my signature in presence of two witnesses.

WILLIAM W. HENDRIX.

Witnesses:
J. S. BRIGGS,
THOS. B. LYNE.